United States Patent
Slyter (10) Patent No.: US 7,726,922 B2
(45) Date of Patent: Jun. 1, 2010

(54) QUICK RELEASE SUPPORT POST AND ASSOCIATED METHOD

(75) Inventor: Kenneth M. Slyter, Kent, WA (US)

(73) Assignee: The Boeing Company, Chicago, IL (US)

( * ) Notice: Subject to any disclaimer, the term of this patent is extended or adjusted under 35 U.S.C. 154(b) by 1042 days.

(21) Appl. No.: 10/730,972

(22) Filed: Dec. 9, 2003

(65) Prior Publication Data

US 2005/0121560 A1 Jun. 9, 2005

(51) Int. Cl.
*F16B 13/06* (2006.01)

(52) U.S. Cl. ............................. 411/45; 411/48; 24/297; 24/453

(58) Field of Classification Search .................. 248/65, 248/70, 71, 73, 74.1, 74.3; 411/33, 45, 46, 411/47, 48; 403/28, 29, 30, 157, 166, 179, 403/220, 221, 408.1, 203, 111, 145, 146, 403/147, 148, 149, 272, 223, 224, 225, 226, 403/227, 228, 229, 238, 243, 260, 365, 369, 403/371; 24/297, 453, 607
See application file for complete search history.

(56) References Cited

U.S. PATENT DOCUMENTS

| 3,112,547 | A |   | 12/1963 | Poe |  |
|---|---|---|---|---|---|
| 3,116,528 | A |   | 1/1964 | Poe |  |
| 3,214,808 | A |   | 11/1965 | Litwin |  |
| 3,582,100 | A | * | 6/1971 | Allsop | 280/821 |
| 4,027,847 | A | * | 6/1977 | Johnson | 249/190 |
| 4,114,509 | A |   | 9/1978 | Poe |  |
| 4,369,947 | A | * | 1/1983 | Kuwano | 248/74.2 |
| 4,410,162 | A | * | 10/1983 | Wlodkowski et al. | 249/215 |
| 4,458,385 | A |   | 7/1984 | Espinoza |  |
| 4,813,105 | A |   | 3/1989 | Espinoza |  |
| 5,354,021 | A |   | 10/1994 | Farrell |  |
| 5,431,508 | A | * | 7/1995 | Kitamura | 403/325 |
| 6,672,547 | B1 | * | 1/2004 | Westerberg et al. | 248/74.1 |
| 2004/0021042 | A1 | * | 2/2004 | Stephen et al. | 248/68.1 |
| 2004/0206855 | A1 | * | 10/2004 | Caveney et al. | 248/68.1 |

OTHER PUBLICATIONS

*Cable Clamps*; Hartwell Commercial; 1997-2000 Hartwell Corporation; available at <http://www.hartwellcorp.com/cable.asp> (visited Mar. 15, 2001).

* cited by examiner

*Primary Examiner*—A. Joseph Wujciak, III
(74) *Attorney, Agent, or Firm*—Alston & Bird LLP (57) ABSTRACT

A quick release support post and associated method are provided to attach a cable to a structure and later move the cable location without the need for many small parts and tools. Thus, cables and wires may be installed in hard-to-reach areas quicker and easier than with conventional clamps because no tools are required and an installer generally does not have to use both hands. Because the quick release support posts and associated method require only a hole in the structure for installation, there is no need for extra materials, and minimal weight is added to the structure during installation or movement. In addition, the quick release support posts and associated method of the present invention create efficient cable management systems because the support posts may be various lengths and cables may be grouped and secured to the support posts together, which makes trouble shooting and later moves much easier.

19 Claims, 8 Drawing Sheets

QUICK RELEASE SUPPORT POST AND ASSOCIATED METHOD

FIELD OF THE INVENTION

The present invention relates to securing cables to structures, and more particularly to quick release support posts that facilitate in cable installation, post-installation movement, and cable management.

BACKGROUND OF THE INVENTION

Modern vehicles and other structures utilize many systems, such as lighting and electronics, that have various separate components. For example, the systems may have dedicated components, such as receptacles, controls and/or displays, and shared components, such as power supplies and processors. The components may be located remotely from each other, which necessitates cables, including wires, to connect the components for the systems to function properly. Thus, the cables may span a considerable length depending upon the locations of the components relative to one another. It is typically desirable to enclose the cables in tubes, such as raceways, that extend along a relatively secluded area of the vehicle or structure in order to protect the cables and the people in the vehicle or structure. Often, however, the raceways are filled with cables or are otherwise accessible and the system installers must extend bundles of cables through another area of the vehicle or structure.

The cables outside of the primary raceways are typically assembled into bundles and secured using a variety of fasteners, such as nylon-type clamps and saddle-brackets. It is essential that the clamps are installed without damaging the cable bundles in order for the systems that the cables support to function properly. It is also important that once the cable clamps are installed, they remain in place when subjected to various vibrational and other forces that the structure containing the cables and clamps may encounter to prevent damage to the cables, such as by abrasion between the cables and the clamps. For example, modern aircraft require hundreds of clamps to secure the many cables that connect the systems and extend along the interior of the aircraft. To ensure the cables are out of the way of passengers or crew onboard the aircraft, some of the clamps may be located in relatively secluded areas of the aircraft that may be difficult to reach, such as stow bins, side panels and/or ceiling panels.

Conventional cable clamps are typically in the form of a P-clamp or elongated strap in combination with a fastener. For example, U.S. Pat. Nos. 4,813,105 and 5,354,021 are clamps used in the aviation industry that utilize an adjustable flexible strap to secure the cable bundle, as well as a fastener to attach the assembly to a structure. Conventional cable bundle clamps require at least one, and typically two, items of loose hardware and structural provisioning for each attachment to add support to a portion of cable weighing only a few ounces. For instance, in order to install most cable bundle clamps, a hole must first be drilled into a secondary structure face sheet, such as in stowbins or interior panels. A clamp or bracket is positioned around the cable. Then, potting compound and a steel insert is placed within the hole to provide an "anchor" for a screw that is inserted through a hole in the cable clamp or bracket and within the potting to secure the assembly onto the face sheet. Therefore, conventional cable bundle installation generally requires many pieces of loose hardware and tools to assemble the clamps. Consequently, when installing cable bundles in tight areas, it is difficult to use the tools and manage the small parts. In addition, each interior cable bundle requires enough cable clamp attachments to keep the clamps spaced less than one foot apart for proper support. Because of this difficulty and the multiple number of clamps that must be installed, the conventional installation process is labor-intensive and time consuming.

Frequently, it is also desirable to stack cable bundles in "Christmas tree" fashion by arranging the clamps in a stack using one fastener. Therefore, when one clamp is in need of repair or removal, several other clamps will first require removal with tools before enough space is created to reach the cable bundle clamp requiring attention, which is also labor-intensive and time-consuming for the installer. In addition, when stacking clamps of this type, cable management is difficult because there is no way to ensure that certain types of cables, such as those for the electrical systems, are grouped together. Without cable management, trouble shooting and movement of only certain systems and their associated cables is difficult.

Furthermore, a slight change in the location of a component of a system may require the cable bundle routes to change, which, at the least, requires a significant amount of time and labor to remove the clamp fasteners and clamps with tools and reinstall them in the new location. In some cases, the structural designers/engineers may have to revise the structure to accommodate the new cable bundle attachments due to the space required and structural support needed for installation. Thus, because new holes must be drilled and new potting compound and/or steel insert applied, the existing structure may not be able to withstand the extra weight. This is most prevalent on passenger interior commodities of an aircraft, such as in sidewalls, stowbins, and ceiling panels, which may be made of lightweight materials, such as composite face sheets over a honeycomb-type core material. In addition, the structural panels cannot provide a grid of inserts to allow for many possible cable bundle installations because of the excessive weight of the inserts and the prohibitive expense of the labor involved in the tedious process of preparing for attachment that may not be utilized.

Another clamping technique utilizes an adjustable strap with one hole at a first end and a series of holes arranged linearly near the opposed second end, such that the fastener may be inserted through both the one hole and an appropriate hole selected from the series of holes near the second end. As such, the strap forms a loop through which the cable or cables to be secured to the structure may extend. The fastener includes an expandable member that is inserted into a hole of appropriate size in the structure after also being extended through the holes of the strap. A pin is then inserted through the expandable member, which expands the expandable member to secure the clamp to the structure. While this clamping technique is useful because it eliminates the need for tools, potting compound, and steel inserts, the strap feature with many holes along one end does not provide a strong enough clamp for cables in many applications that are subjected to relatively large forces, such as frequent movements and vibrations. Thus, if the strap is wrapped around many cables or one large cable, then the loop that extends about the cable(s) will include a larger number of the holes, which is the weakest part of the strap. Thus, the strap is more likely to break. In addition, because there is no way to cinch the strap securely around the cables since the locations of the holes in the strap are predetermined, then the cables may be loose in the strap, which could cause the strap to rub against the cables and damage the cables such that the systems supported by the cables may become inoperable. Furthermore, the straps may not be stacked due to the short length of the pin.

There is, therefore, a need in the industry for an improved technique for tightly securing cables to a structure and permitting the cables to be released to more easily install and reroute cable bundles. It is also desirable to eliminate the need for tools to secure cables to a structure, which will permit the cables to be more readily installed in limited access areas and easily released when removal is desired. In addition, an improved technique for separately securing a number of cables in an orderly fashion is desired for the purposes of cable management. Furthermore, there is a need for a quick release cable clamp that is strong enough, and secures the cables tightly enough, to withstand the weight of heavy cables and forces, such as vibrational forces, without damaging the clamp or the cables.

SUMMARY OF THE INVENTION

In accordance with the present invention, a quick release support post, associated method, and quick release cable clamp are provided to attach cables to a structure and to facilitate later removal of the post or clamp, or a later move of the post or clamp to a different location without the need for many small parts and tools. Thus, cables, including wires, optical fibers and the like, may be installed in hard-to-reach areas quicker and easier than with conventional clamps because no tools are required and an installer generally does not have to use both hands. Furthermore, because the quick release support post, associated method, and quick release cable clamp of the present invention require only a hole in the structure for installation, there is no need for potting compound or steel inserts, and no extra weight is added to the structure during installation or movement. As such, it is less likely that a weight-sensitive existing structure must be redesigned when moving the quick release support posts or clamps of the present invention than when moving the conventional clamps. In addition, the quick release support posts and associated method of the present invention create efficient cable management systems because the cables may be grouped and secured to the support posts together, which makes trouble shooting and later moves much easier. Overall, the quick release support posts and associated method of the present invention save significant time, labor, hardware, and associated costs because they are more efficiently installed, moved and removed than conventional cable clamps.

One embodiment of the quick release support post of the present invention includes an elongated rod having a varying cross-section in the longitudinal direction, an elongate sleeve mounted on the rod, and at least one attachment element carried by the sleeve to attach at least one cable. The attachment element may be a ring with an opening that is larger than the sleeve and attached to the sleeve by a plurality of spokes extending inwardly from the ring to the sleeve. The support post of this embodiment may also include at least one tie member to attach the cable(s) to the attachment element.

The sleeve is capable of being axially translated along the rod. The sleeve initially is mounted on the rod in a first position to facilitate insertion of a portion of the sleeve in a hole defined by the structure, then the sleeve may be translated along the rod to a second position to facilitate a positive engagement of the portion of the sleeve within the hole.

In addition, in either of the above embodiments, the rod may have a first portion, which may be a first cylindrical portion, with a first cross-sectional shape and a second portion, which may be a second cylindrical portion, disposed proximate to and displaced in the longitudinal direction from the first portion. The second portion has a second cross-sectional shape that is larger than the first cross-sectional shape. The rod may be made of many pairs of first and second portions and, if so, then a circumferential groove may be located between the pairs. Because more than one sleeve may be mounted on the rod having many pairs of first and second portions, the circumferential groove facilitates breaking a rod that is initially too long to a shorter length appropriate for the number of sleeves. As such, each sleeve may be associated with a respective pair of first and second portions, and the sleeve may loosely surround the first and second portions while in the first position and may engage the second portion while in the second position. When engaging the second portion, at least a portion of the sleeve may radially expand, which will cause the sleeve to be positively engaged within the hole defined by the structure. Furthermore, the sleeve may be made of two parts, an expandable engagement member, which is the portion that expands as the sleeve is moved from the first position to the second position, and a sleevelike member connected to the expandable engagement member that carries the attachment element or otherwise permits engagement by the tie member.

The method for attaching a cable to a structure of the present invention includes providing an elongated rod having a varying cross-section in a longitudinal direction and an elongate sleeve capable of being axially translated along the rod, inserting a portion of the sleeve into a hole defined by the structure, translating the sleeve axially along the rod to facilitate positive engagement of the sleeve within the hole, and attaching at least one cable to the sleeve. The method also may include mounting the sleeve upon the rod in a first position prior to inserting a portion of the sleeve into the hole. In addition, translating the sleeve axially along the rod may include expanding the portion of the sleeve within the hole to positively engage the sleeve within the hole. Furthermore, attaching at least one cable to the sleeve may be accomplished by encircling the cable(s) and an attachment element that may be carried by the sleeve with a tie member.

Thus, the embodiments of the support post and associated method summarized above provide an efficient manner in which to secure cables to structures without requiring tools for installation or movement of the support post. Because of the shape and cooperation of the elongated rod and the sleeve, the sleeve is positively engaged within a hole to provide a base to which cables may be attached. In addition, because the quick release support post and associated method of the present invention do not require potting compound and/or a steel insert to install the clamps, but instead only require a properly sized hole in the structure, installing the support post is simple and does not add much extra weight to the structure. As such, the support posts may be moved to another location on the structure without concern over adding too much weight to weight-sensitive structures. Furthermore, the support post and associated method of the present invention provide efficient cable management because certain types of cables may be grouped together and kept separate from other cable types by securing the bundles to different attachment elements and/or different sleeves of the support post.

Another embodiment is a quick release cable clamp that includes a pin, an expandable engagement member, and a clamp element defining an aperture of a predetermined size to receive a cable of a corresponding size. The pin has a first portion, which may be a first cylindrical portion, with a first cross-sectional shape and a second portion, which may be a second cylindrical portion, with a second cross-sectional shape that is larger than the first cross-sectional shape. The expandable engagement member is mounted on the pin in a first position and is capable of radially expanding as the engagement member is axially translated along the pin from the first position to a second position to facilitate engagement with a hole defined by the structure. The clamp element also defines an opening at each distal end through which said engagement member extends. Moreover, the clamp element may have a P-shaped cross-section when the distal ends of the clamp element meet.

The cable clamp of the above embodiment also provides an efficient manner in which to clamp a cable with a clamp of a predetermined size without using tools or many small parts. In addition, this embodiment is easily moved to a different location on the structure because it also requires only a hole in the structure for installation. Therefore, all of the quick release cable clamp and associated method embodiments reduce the time, labor, hardware, and associated costs normally involved in cable clamp installation.

BRIEF DESCRIPTION OF DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The quick release support post of the present invention includes an elongated rod and an elongated sleeve mounted on the rod. The sleeve may include an expandable engagement member, such as an expanding rivet-like feature, near one end, such as at the base of the sleeve. In addition, at least one attachment element, such as a ring, may be carried by the sleeve, such as being longitudinally centrally located on the sleeve. The attachment element, such as a ring, may be attached to the sleeve by multiple spokes that allow straps or ties to be wrapped around the attachment element and an object, such as a cable, needing support. The sleeve defines a longitudinal hole to allow the rod to pass through the sleeve. At one end of the sleeve, the diameter of the hole may be compatible with the expandable engagement member, such as an expanding rivet, to allow multiple sleeves to be mounted on the rod. Thus, the cross-section of the rod may vary longitudinally to interface with the sleeve(s) via the expandable engagement member. As such, when the rod is pushed through the sleeve(s), portions of the rod may expand the expandable engagement member of a respective sleeve to lock the sleeve(s) onto the rod. The rod also may include grooves to allow the rod to be broken to a length that accommodates the desired number of sleeves. Therefore, the shape of the rod provides a tactile indication of the position of the rod relative to the expandable engagement member(s) of the sleeve(s).

Figure 1:
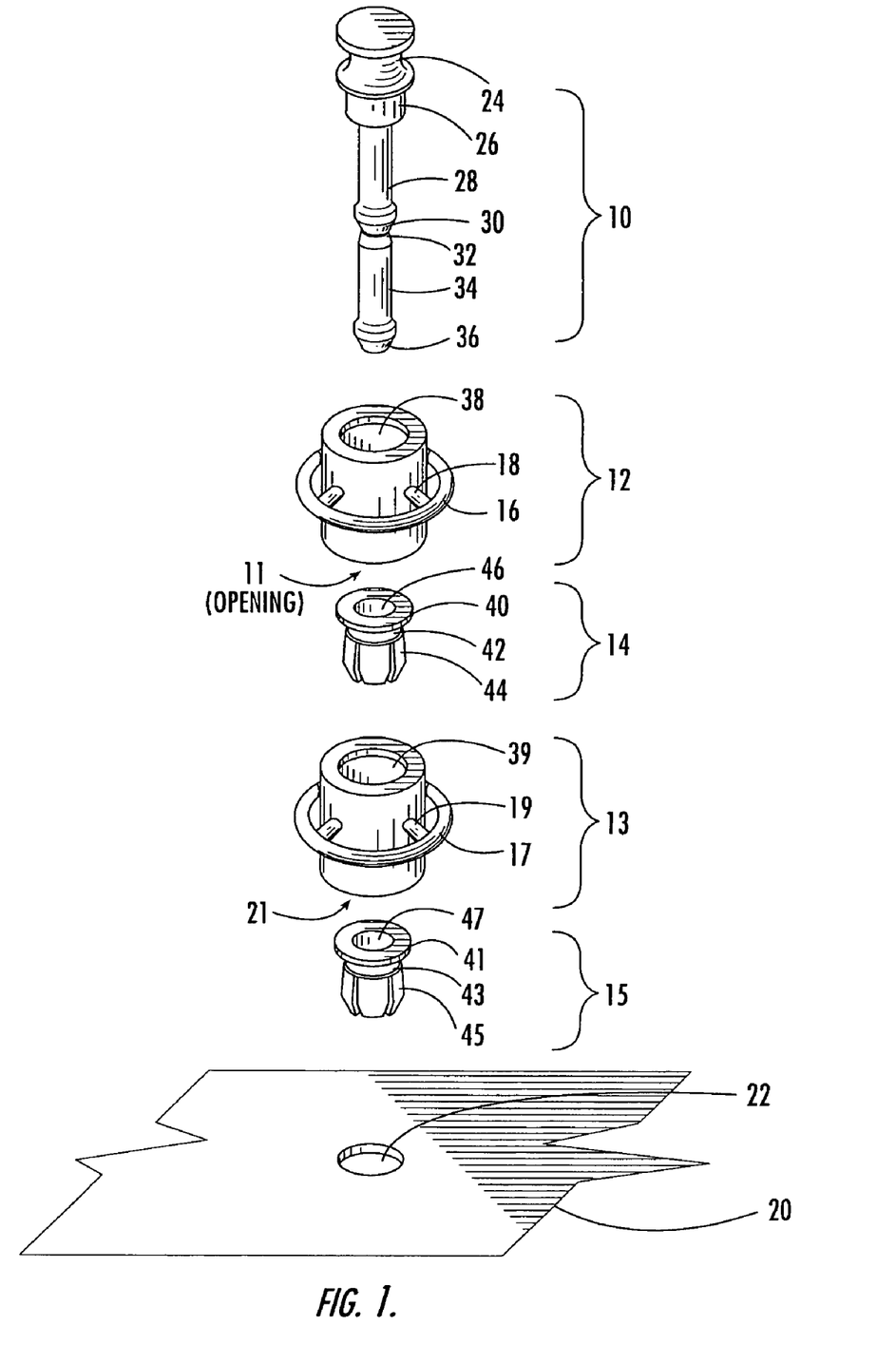
FIG. 1 is an exploded expanded view of a quick release support post including an elongated rod with a varying lengthwise cross-section and two sleeves adapted to axially translate along a portion of the rod according to one embodiment of the present invention.

One embodiment of the quick release support post apparatus and method of the present invention is shown in FIG. 1. This exploded view of a support post illustrates the separate components of the support post, which include an elongated rod 10, sleeves 12, 13, and expandable engagement members 14, 15. Although there are two sleeves 12, 13 and two expandable engagement members 14, 15 in the embodiment of FIG. 1, other embodiments may have one or more sleeves and one or more expandable engagement members, with the number of sleeves and the number of engagement members generally being equal. As explained below, the length of the elongated rod corresponds to the number of sleeves, with a longer rod supporting more sleeves.

In the embodiment shown in FIG. 1, the elongated rod 10 has a handle 24, a handle base 26, and at least one pair of first and second portions, all of which extend longitudinally from the handle 24. The handle 24 may be grasped by an installer and facilitates installation and removal of the sleeves 12, 13 and expandable engagement members 14, 15. The handle base 26 may have a slightly smaller circumference than the opening 38 in the sleeve 12 such that the rod 10 cannot, or can only slightly, move in the lateral or radial direction when fully inserted in the sleeve 12 (i.e., the second position). The first and second portions, or pairs of first and second portions, extend longitudinally from the handle base 26. The first portions 28, 34, which may be cylindrical, have smaller cross-sections than the second portions 30, 36, which may be cylindrical, spherical or the like. The rod 10 cooperates with the sleeves 12, 13 and the expandable engagement members 14, 15, as described hereinbelow. The rod 10 is preferably made of nylon or plastic, but may be formed of other materials.

The number of pairs of first and second portions in rod 10 corresponds to the number of sleeves. If the rod includes more than one pair of first and second portions, the rod also preferably defines a circumferential groove 32 that is located between the second portion 30 of one pair and the first portion 34 of the next pair. The groove 32 facilitates engagement of the expandable engagement member 14 with the second portion 30 because the groove 32 allows the expandable engagement member 14 to secure around the second portion 30 and, in combination with the first portion 34, creates resistance in pulling the rod 10 out of sleeves 12, 13, which makes it more difficult for the rod 10 to be inadvertently disengaged from the sleeves 12, 13.

The circumferential grooves also permit the elongated rods to be adjusted to the correct length by breaking off excess pairs of first and second portions. Thus, elongated rods may be manufactured in one or a few standard lengths, such that installers do not have to decide the exact sizes they will need prior to beginning installation. The installers may instead break the rods at the circumferential grooves between the pairs of first and second portions to obtain a rod of appropriate length at the time of installation. For example, in FIG. 1, an elongated rod with three or more pairs of first and second portions may have been adjusted to two pairs by breaking the rod at a circumferential groove below the second portion 36 to create rod 10.

The sleeves 12, 13 may be hollow cylinders extending between opposed ends. The sleeves generally include annular segments proximate the opposed ends that define respective openings 38, 39, 11, 21. These openings are typically smaller than the cylindrical opening defined by the medial portion of the sleeves. In addition, the sleeves 12, 13 carry an attachment element to which a cable or cables may be attached, for example, cable attachments such as cable ties may be used to attach the cables to the attachment element(s). While the quick release support post will be described in terms of its attachment to cables, cables is intended to include any of a wide variety of elongated members, including wires, optical fibers, optical ribbons and the like. The attachment elements may be any type of element capable of receiving a cable attachment. For example, in the embodiment of FIG. 1, the attachment elements are rings 16, 17 that have openings larger than the sleeves 12, 13, and the rings 16, 17 may be attached to the sleeves 12, 13 with two or more spokes 18, 19 that extend inwardly from the rings 16, 17 to the sleeves 12, 13. The sleeves 12, 13, including the attachment elements, are preferably made of a high strength material, such as nylon.

The expandable engagement members 14, 15 may have upper portions 40, 41 defining holes 46, 47, respectively, that extend therethrough. The outer edges of the upper portions 40, 41 may be any shape, but the upper portions 40, 41 are slightly smaller than the interior openings in the sleeves 12, 13, and larger than the openings 11, 21 in the annular segments of the sleeves 12, 13. In addition, the expandable engagement members 14, 15 have a plurality of arms 44, 45, the nominal circumferences of which are slightly larger than the openings 11, 21 in the annular segments of the sleeves 12, 13. The arms 44, 45 extend outward from the upper portion of the respective engagement member, but are separated from one another by slits between the adjacent arms. As such, the arms permit some inward and outward radial movement when subjected to appropriate pressure. The arms 44, 45 are arranged to define a longitudinally extending opening that is aligned with the hole defined by the upper portion of the respective engagement member. The hole defined by the upper portion of an engagement member and generally the opening defined by those portions of the arms proximate the upper portion of the respective engagement member are larger in cross-section, i.e., diameter, than at least the opening defined by the distal portions of the arms 44, 45. Thus, the second portions 30, 36 of the rod 10 may fit somewhat loosely within the hole defined by the upper portion of the engagement member and the portion of the arms proximate the upper portion of the respective engagement member while in the first position, as described below. The second portions 30, 36, however, are at least slightly larger than the opening defined by the distal portions of the arms 44, 45, such that movement of the rod 10 relative to the engagement members 14, 15 to the second position, in which the distal ends of the arms are positioned around the second portions of the rod, causes the arms 44, 45 to be deflected radially outward. The expandable engagement members 14, 15 also define outwardly opening circumferential grooves 42, 43 between the upper portions 40, 41 and the arms 44, 45 for engaging the annular segment of a respective sleeve, as described below. The expandable attachment members 14, 15 are also preferably of made a high strength material, such as nylon.

In this embodiment, the expandable engagement members 14, 15 are placed inside sleeves 12, 13 during fabrication of the sleeves 12, 13. As such, the arms 44, 45 may be pushed through the lower segment openings 11, 21 in the sleeves 12, 13. The extension of the distal portions of the arms may be tapered radially inward to facilitate insertion through the openings 11, 21, which in turn forces the arms 44, 45 to move closer together as they move through the openings 11, 21. Once the arms 44, 45 get through the openings 11, 21 the arms 44, 45 return to their normal state, which is slightly larger than openings 11, 21, thereby capturing the annular segment between the arms 44, 45 and the larger upper portion 40, 41 of the engagement member. In particular, the annular segments of the sleeves 12, 13 generally rest in the circumferential grooves 42, 43 of the expandable engagement members 14, 15. The fabrication of the sleeves 12, 13, may then be completed.

In an alternative embodiment, the expandable engagement members 14, 15 and the sleeves 12, 13 may be fabricated in one piece. As such, the arms 44, 45 surround and extend from the openings 11, 21 in the lower segments of the sleeves 12, 13. In this embodiment, the sleeve and arms are also preferably made of a high strength material, such as nylon.

Figure 2:
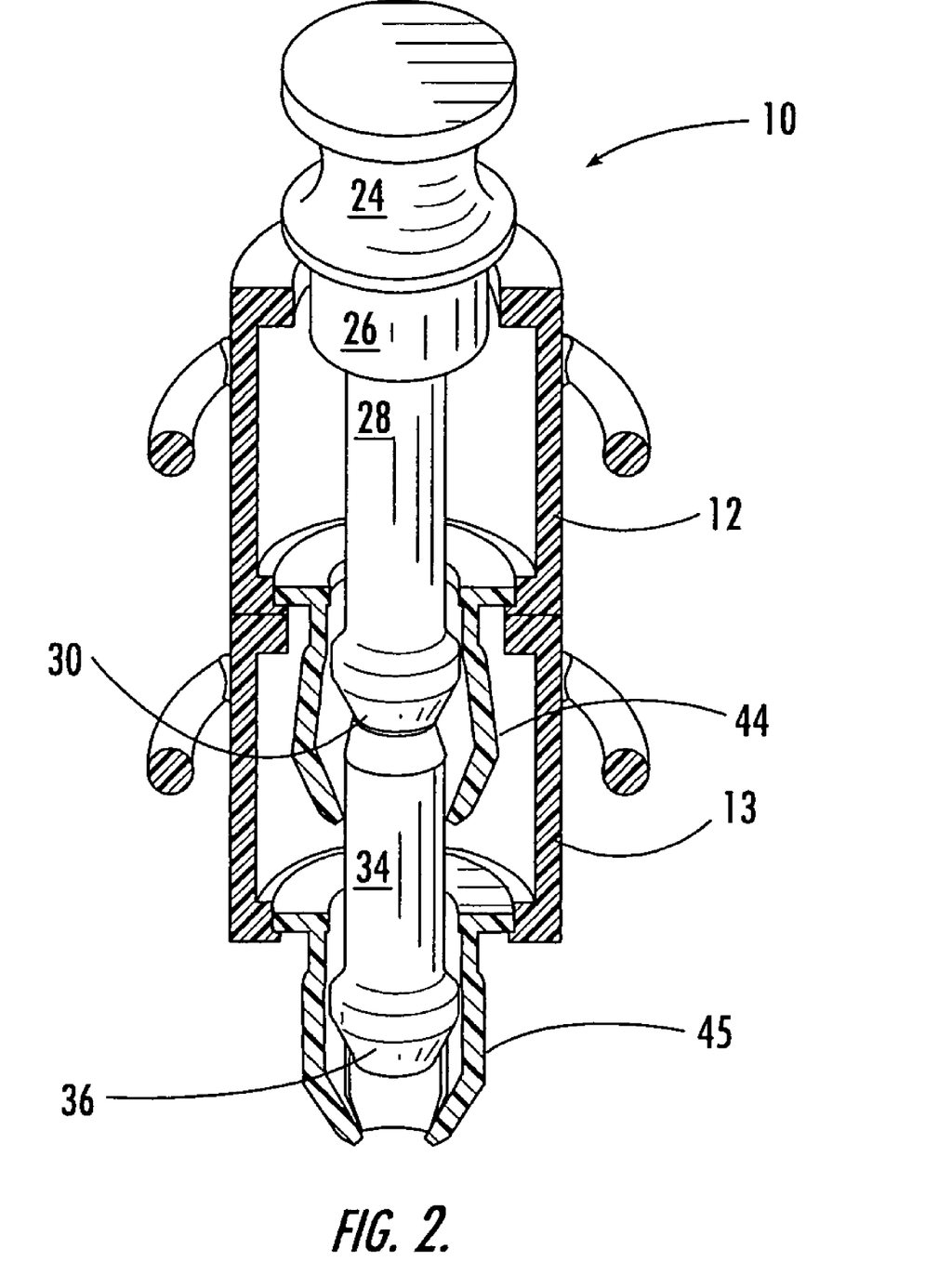
FIG. 2 is a cross-sectional view of the quick release support post of FIG. 1 in a first position according to one embodiment of the present invention.

FIG. 2 is a cross-sectional view that illustrates the sleeves 12, 13 mounted in a first position on the rod 10. In this embodiment, sleeves 12 and 13 are longitudinally aligned such that the arms 44 may be inserted into the opening 39 defined by the upper segment of sleeve 13. Slight pressure applied to sleeve 12 in the direction of sleeve 13 and/or slight pressure applied to sleeve 13 in the direction of sleeve 12 causes the annular segment to force the arms 44 inward as the arms 44 move through opening 39. Once the arms 44 are completely inserted into sleeve 13, the arms return to their normal position, which is larger than the opening 39 defined by the annular segment and serves to hold sleeves 12 and 13 together. More sleeves may be joined to sleeves 12 and 13, if desired, in the same manner as described above. The rod 10 then may be inserted into the opening 38 in the annular segment of sleeve 12 and extended through sleeves 12 and 13 to arrive at the first position, as shown in FIG. 2. In the first position, the second portions 30, 36 of the rod 10 are within the part of the arms 44, 45 proximate the respective sleeve and/or the hole defined by the upper portion of the respective engagement member. Additionally, the first portion 34 of the rod 10 is positioned within the distal portion of the arms 44, and the distal portion of the arms 45 is empty, such that the arms 44, 45 are not radially expanded in the first position. Thus, the lengths of the first and second portions must be such that the respective portions are within the appropriate parts of the respective arms in the first position.

Whether there is one sleeve, or more than one sleeve joined together as described above, sleeve 13 may be longitudinally aligned with the hole 22 in structure 20 such that the arms 45 may be inserted into the hole 22, as shown in FIG. 2. In addition, the rod may be in the first position with respect to the sleeve or sleeves during insertion into the hole 22, or sleeve 13 may be inserted in hole 22 prior to insertion of the rod in the sleeve or sleeves. To insert sleeve 13 into the hole 22, slight pressure may be applied to sleeve 13 in the direction of the hole 22, which causes arms 45 to be forced radially inward as the arms 45 move through the hole 22. Once the arms 45 are completely inserted into hole 22, the arms 45 return to their normal position, which at least temporarily holds sleeve 13 to the structure 20.

Figure 3:
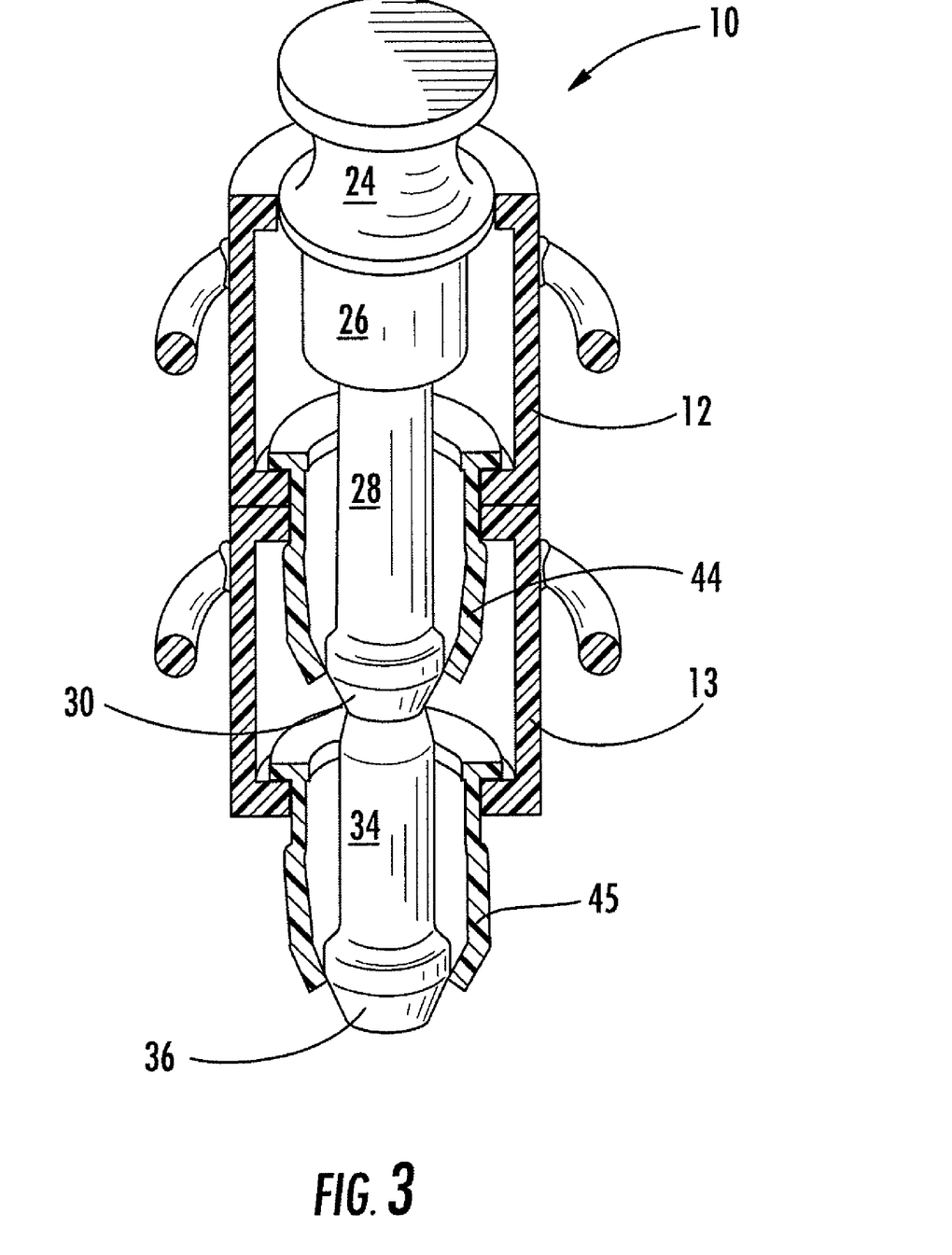
FIG. 3 is a cross-sectional view of the quick release support post of FIG. 1 in the second position after the sleeves are axially translated along a portion of the rod to cause the upper sleeve to engage the lower sleeve and to expand the lower sleeve into an engaging relationship within the hole defined by the structure according to one embodiment of the present invention.

Once the engagement members have been inserted, either into the opening defined by the annular segment of another sleeve or a hole defined by the structure, the rod is moved to the second position. FIG. 3 is the cross-section of the sleeves 12, 13 and the rod 10 in the second position, such that the sleeves are securely engaged to each other and the structure 20. To arrive at the second position, pressure is applied to rod 10, which is in the first position, to urge the rod 10 toward the structure 20. The sleeves 12, 13 are axially translated along the rod 10 until rod 10 is fully inserted in the sleeves. Preferably, the handle base 26 is within opening 38 of the sleeve 12 and the handle 24 is butted against the upper segment of the sleeve 12, such that the rod 10 may not be moved laterally when it is in the second position. In addition, the distal ends of the arms 44 now surround respective second portions 30, 36 of rod 10 when the rod 10 and sleeves 12, 13 are in the second position. Because the opening defined by the distal ends of the arms 44, 45 is smaller, the second portions 30, 36 force the arms 44, 45 to expand, which positively engages sleeve 12 to sleeve 13 and sleeve 13 to structure 20. Thus, in the second position, the sleeves 12 and 13 and the rod 10 form a support post 48 that is positively engaged to structure 20.

To remove the support post 48 from the structure 20, pressure may be applied to rod 10 in the direction opposite the structure 20. The amount of pressure necessary to move the rod 10 and sleeves 12, 13 from the second position to the first position should be enough to ensure that the normal pressures to which the support posts are subjected are not enough to force the rod 10 and sleeves 12, 13 to disengage from the structure 20, but not so much that a tool is needed to move the rod 10 and sleeves 12, 13 to the first position. Once the rod 10 and sleeves 12, 13 are in the first position, slight pressure may be applied to sleeve 13 in the direction opposite the structure 20, which will force the arms 45 inward as the arms 45 move through the hole 22 and the support post is disengaged from the structure 20. The process of easily moving the rod and sleeves from the second position to the first position may be referred to as the quick release functionality of the support posts of the present invention. To separate sleeve 12 from sleeve 13, the rod 10 is removed from the sleeves 12, 13 by applying pressure to the rod 10 in the direction opposite the sleeves. Once the rod 10 is removed from the sleeves 12, 13, the sleeves may be disengaged by applying pressure to each sleeve in the direction opposite the other sleeve and forcing the arms 44 inward as they move through opening 39 in sleeve 13.

The hole 22 in the structure 22 must have a circumference slightly smaller than the circumference of the arms 45 in the normal position, but large enough to allow the arms 45 to move through the hole 22 when the arms are forced slightly inward. The structure 20 may be made of any type of structural material, but is typically metal, plastic, composite or the like. If the material is unyielding throughout its depth, the depth of the material must be such that the arms 45 may expand on the blind side of the structure 20 that is opposite the side from which the post is inserted. If the material is such that the arms 45 may expand within the hole 22 in the material, then there is no limit on the depth of the material. An example of this type of material is a honeycomb-type material, such as aramid paper with thin front and back face sheets made of composite material, which is a high strength material made of fibers, such as graphite fibers, and resin, such as epoxy resin. This type of material construction is frequently used in the interior of aircraft because it is lightweight and high strength.

Because installation of the sleeves and rods that form the support posts only requires holes in the structure, the structural designers may determine how many holes, support posts, and cables the structure may carry before the structural integrity is compromised. As such, holes may be pre-drilled in structures in areas where cables are most likely to run and the installers may easily move the support posts to other holes or add supports posts, if necessary. This is a significant improvement over the conventional clamps that required compound and steel inserts in the structure, which increased the weight of the structure, and, as such, the structure would have to be redesigned and fabricated in order to move the clamps or add clamps. The simple movement and installation process for the support posts of the present invention is also much less time-consuming, less labor intensive and less expensive than the conventional installation and movement process that required compound, steel inserts, and possibly a new structure to move or add conventional cable clamps.

Figure 4:
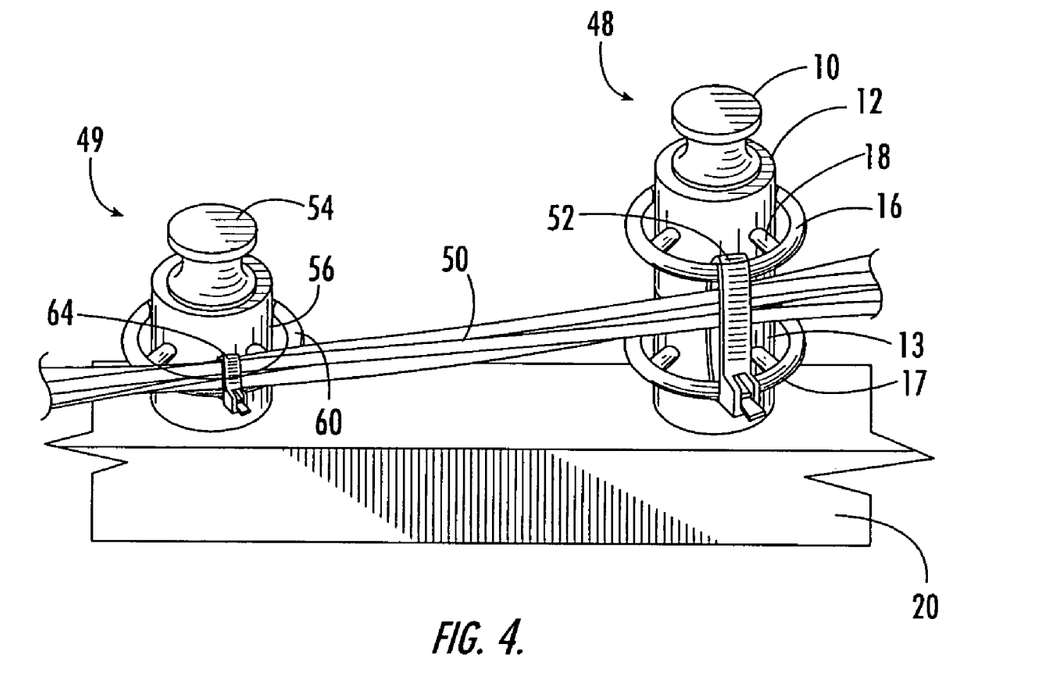
FIG. 4 is a perspective view of the quick release support post of FIG. 1 in engagement with the holes defined by the structure, and tie members attaching the cables to the sleeves, according to one embodiment of the present invention.

FIG. 4 depicts the manner in which cables may be tied to the support posts according to one embodiment of the apparatus and method of the present invention. FIG. 4 also illustrates a support post 49 with one sleeve in addition to the support post 48 with two sleeves and how they may be utilized together. Once the support posts are mounted to the structure 20, a cable or cables 50 may be tied or otherwise connected to the attachment elements 16, 17 and 60 of sleeves 12, 13 and 56, respectively.

The cables 50 may be tied to the attachment elements 16, 17 and 60 with any type of tie member. For example, in FIG. 4, a basic cable tie in which one end may be received by the other end, such that the tie may be adjusted to the exact size necessary to secure the cables, is used to tie the cables 50 to the attachment elements 16, 17, and 60. Once this type of cable tie is adjusted to the correct circumference, it cannot be readjusted to a larger circumference. To remove this type of cable tie, it must be cut with a cutting tool. While various types of cable ties known to those skilled in the art may be utilized, one example of a cable tie is the PLT.6SM-C cable tie made by Panduit Corporation.

As FIG. 4 illustrates, a cable tie 52 may be threaded between the attachment elements 16, 17 and the sleeves 12, 13, respectively, and may be tightened around the cables 50 to secure the cables 50 to the support post 48. Alternatively, the cable tie 52 may be threaded between the attachment element 16 and the sleeve 12, or between the attachment element 17 and sleeve 13, and tightened around the cables 50 to secure the cables 50 to one sleeve of the support post 48. This embodiment may be advantageous for cable management purposes, such that all cables of one type may be secured to one sleeve and all cables of another types may be secured to another sleeve. Similarly, a cable tie 64 may be threaded between the attachment element 60 and the sleeve 56, and may be tightened around the cables 50 to secure the cables 50 to the support post 49.

Thus, the support posts of the apparatus and method of the present invention provide an efficient, easy, secure and safe way to attach cables to structures. The support posts may have varying lengths, depending upon the application or environment of the posts, and the support posts allow installers to take advantage of effective cable management techniques that were not possible with the conventional cable clamps. Furthermore, because extra tools or other materials are not necessary to install the support posts, the installation process is less labor intensive, less expensive and less time-consuming, particularly in hard-to-reach areas, than the conventional installation process that required compound and steel inserts be placed in the hole in the structure before the cable clamp could be installed with a fastener and a tool. The quick release functionality of the support posts of the present invention also provides an easy manner in which the support posts and the cables tied to the posts may be moved to a different area of the structure. In addition, if only part of the cables must be moved, the cables can easily be released from the ties to the support posts and another support post may be quickly installed in the area where those cables are to be moved.

Figure 5:
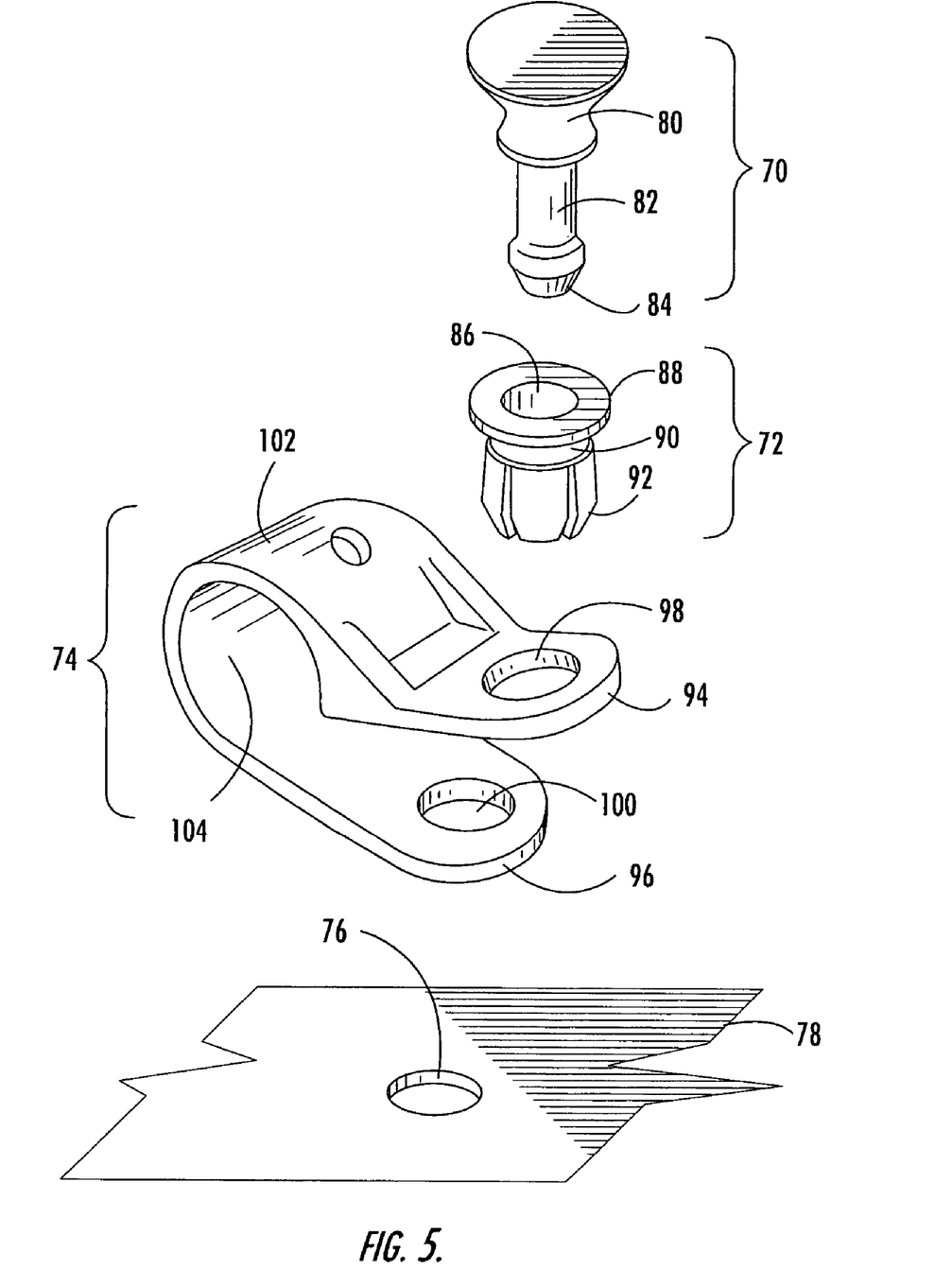
FIG. 5 is an exploded expanded view of a quick release cable clamp including a pin, an engagement member, and a cable clamp with a pre-defined shape to receive a cable according to another embodiment of the present invention.

An embodiment of a quick release cable clamp of the present invention is illustrated in FIG. 5. The quick release cable clamp includes a pin 70, an expandable engagement member 72, and a clamp element 74. To install the quick release cable clamp in a structure 78, a hole 76 must be drilled in the structure 78. The hole 76 has a circumference that is slightly smaller than the outer circumference of the arms 92 of the expandable engagement member 72, but slightly larger than the circumference of the second portion 84 of the pin. The structure may be any type of structural material, the details of which are the same as described hereinabove for the quick release support post.

The pin 70 has a handle 80, a first portion 82, and a second portion 84 having a larger cross-section than the first portion 82. The first portion 82 be cylindrical and the second portion 84 may be cylindrical or spherical or the like. The pin 70 cooperates with the expandable engagement member 72, as described hereinbelow The pin 70 is preferably made of a high strength material, such as nylon, or durable plastic, but may be formed of other materials.

The expandable engagement member 72 has an upper portion 88, a groove 90, a plurality of arms 92, and defines an opening 86 there through. The outer edge of the upper portion 88 may be any shape, but is typically slightly smaller than the area of first arm 94 around the opening 98 defined by the clamp element 74. The length of the groove 90 corresponds to or is slightly longer than the depth of the first arm 94 of the clamp element 74, such that when the expandable engagement member 72 is inserted through opening 98, the opening 98 is aligned with the groove 90, which attaches the expandable engagement member 72 to the first arm 94.

The arms 92 extend from the groove 90 in the direction opposite the upper portion 88 and have a circumference larger than the circumference of the groove 90. The arms 92 are separated from one another by slits between adjacent arms. As such, the arms 92 permit some inward and outward radial movement when subjected to appropriate pressure. The arms 92 are arranged to define a longitudinally extending opening that is aligned with the hole 86 defined by the upper portion 88 of the engagement member 72. The opening defined by those portions of the arms 92 proximate the upper portion 88 are larger in cross-section, i.e., diameter, than at least the opening defined by the distal portions of the arms 92. Thus, the second portion 84 of the rod 70 may fit somewhat loosely within the hole defined by the upper portion 88 of the engagement member 72 while in the first position, as described below, but are at least slightly larger than the opening defined by the distal portions of the arms 92. As such, movement of the rod 70 relative to the engagement member 72 to the second position in which the distal ends of the arms 92 are positioned around the second portion 84 of the rod 70 causes the arms to be deflected radially outward.

The circumference of the opening 86 through the upper portion 88 and the grove portion 90 may correspond to the circumference of the first portion 82 of the pin 70, such that the first portion 82 may slide through the upper portion 88 and grove portion 90 without removing the pin 70 from the expandable engagement member 72 because the handle 80 and second portion 84 are larger than this part of the opening 86. Thus, the pin 70 and expandable engagement element 72 are preferably fabricated simultaneously in this embodiment because the pin 70 may not be inserted or removed from the expandable engagement element 72. The expandable engagement member is preferably made of a high strength material, such as nylon.

The clamp element 74 has a first arm 94 that defines an opening 98, a second arm 96 that defines an opening 100, and a loop portion 102 that defines an opening 104. The first and second arms 94, 96 may be similar in shape and are at least long enough to accommodate the upper portion 88 of the expandable engagement member 72 and the handle 80 of the pin 70. The first and second arms 94, 96 are also capable of being stacked, such that the openings 98 and 100 may be aligned. The opening 98, as described above, is aligned with the groove 90 of the expandable engagement member 72 and, as such, has a circumference slightly larger than the circumference of the groove 90. The opening 100 is aligned with the part of the arms 92 proximate the upper portion 88 and, as such, has a circumference slightly larger than the outer circumference of the part of the arms 92 proximate the upper portion 88. Thus, the opening 100 has a larger circumference than the opening 98.

The loop portion 102 may attach to the arms or continuously extend from the arms, such that when the arms are stacked, the cross-section of the clamp element 74 is P-shaped. While the quick release cable clamp will be described in terms of its attachment to cables, cables is intended to include any of a wide variety of elongate members including wires, optical fibers, optical ribbons and the like. The loop portion 102 defines an opening 104 that is large enough to receive a cable or cables. There may be many different sizes of loop portions 102 to accommodate different size cables or cable bundles. Alternatively, a filler material may be added within the loop portion 102 if the loop portion is too large to tightly secure the cable or cables. The clamp element 74 of the quick release cable clamp of the present invention is preferably made of a high strength material, such as nylon, that is thick enough to withstand the weight of the cables and the various forces to which the cables, structure and clamp will be subjected, such as vibrational, shock, or acoustic forces. In addition, the loop portion 102 of the cable clamp should not have multiple holes and should fit snuggly around the cables to prevent the loop portion 102 from breaking or from damaging the cables by rubbing loose cables during vibrations or other forces that may cause loose cables to move in the loop portion 102. Thus, the cable clamp of the present invention is advantageous over conventional quick release cable straps that have many holes in the loop portion since they are adjustable and may not be securely tightened around the cable(s).

In an alternative embodiment, the arms 92 may extend from the side of the first arm 94 that faces the second arm 96, such that a separate expandable engagement member 72 is not necessary. In this embodiment, the opening 98 would be aligned with the first portion 82 of the pin 70, such that the first portion 82, but not the second portion 84 or the handle 80, may slide though the opening 98. Thus, the pin 70 and clamp element 74 would preferably be fabricated simultaneously because the pin 70 may not be inserted or removed from the opening 98.

Figure 6:
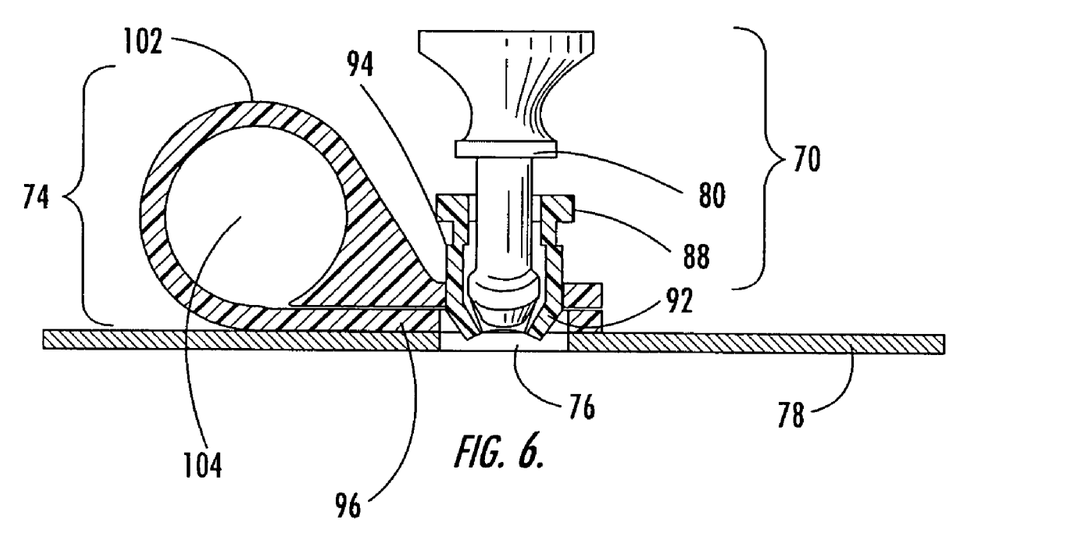
FIG. 6 is a cross-sectional view of the quick release cable clamp of FIG. 5 with the engagement member in a first position and a portion of the engagement member within the hole defined by the structure according to another embodiment of the present invention.

FIG. 6 illustrates a cross-section of the pin 70 and the clamp element 74 in a first position. In the first position, the second portion 84 of the pin 70 is within the part of the arms 92 proximate the upper portion 88 of the expandable engagement member 72, such that the arms 92 are not expanded. At this point, the cable or cables may be received by the opening 104 defined by the loop portion 102, and the second arm 96 is placed on the structure 78 so that the opening 100 is aligned with the hole 76.

Figure 7:
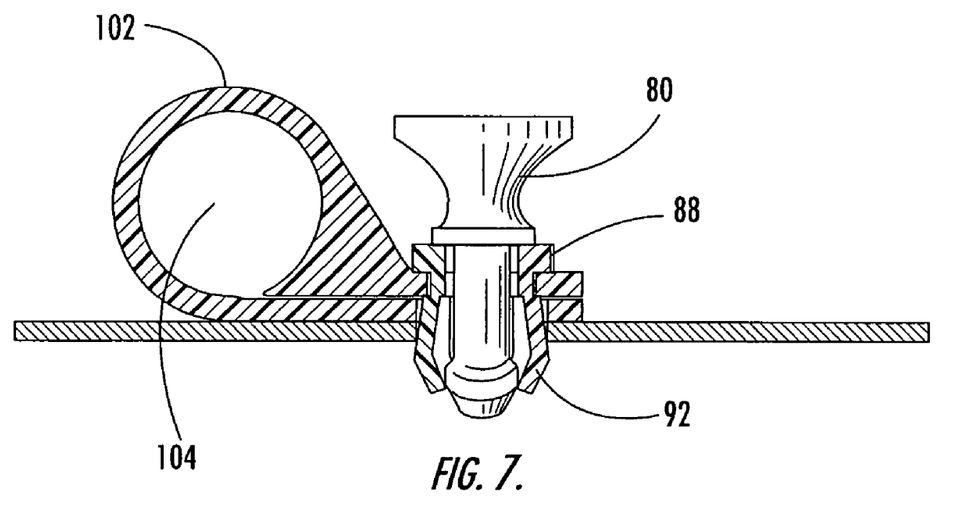
FIG. 7 is a cross-sectional view of the quick release cable clamp of FIG. 5 after the engagement member is moved from the first position to a second position to expand a portion of the engagement member within the hole defined by the structure to provide positive engagement within the hole.
Figure 8:
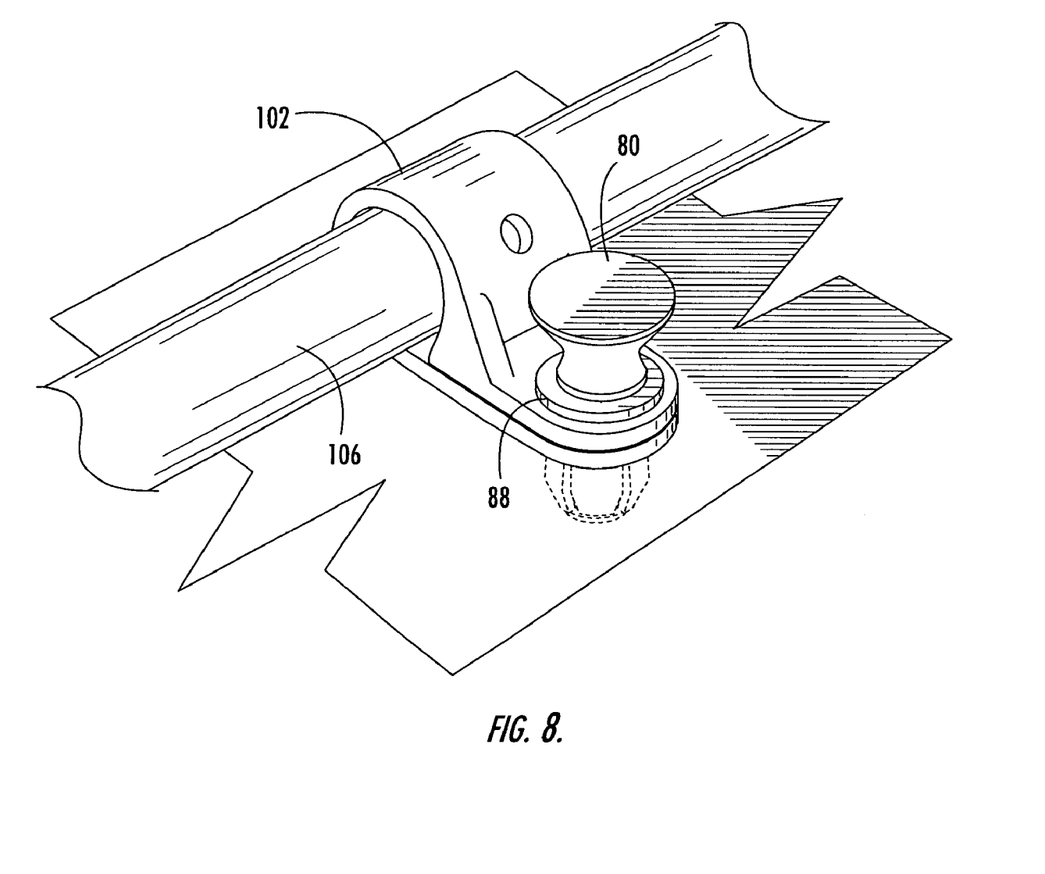
FIG. 8 is a perspective view of the quick release cable clamp of FIG. 5 mounted upon a cable and positioned in engagement with the hole defined by the structure, according to another embodiment of the present invention.

FIG. 7 is a cross-section of the quick release cable clamp in the second position. The second position occurs when the pin 70 is fully inserted in the arms 92, such that the second portion 84 of the pin 70 is in the distal portion of the arms 92, which causes the arms 92 to expand. Thus, while in the first position, the arms 92 are extended through the opening 100 defined by the second arm 96 and through the hole 76 defined by the structure 78, such that the first arm 94 and the second arm 96 are in contact with each other. Pressure is then applied to the handle 80 of the pin 70 in the direction of the structure 78 to push the second portion 84 into the distal portion of the arms 92. The expanded arms 92 have a larger circumference than the hole 76 and the cable clamp is positively engaged within hole 76. Additionally, securely fastening the arms of the cable clamp together causes the loop portion 102 to tightly surround the cable(s) and the cable(s) are then securely attached to the structure 78 via the cable clamp. FIG. 8 illustrates a cable 106 securely attached to the structure 78 within the loop portion 102 of a cable clamp that is positively engaged within the hole 76 defined by the structure 78.

In addition to the advantage of installing the cable clamp of the present invention without tools or other materials, the quick release functionality of the cable clamp is advantageous when the clamp must be removed or moved to a different area of the structure. To release the cable clamp from the structure 78, pressure may be applied to pin 70 in the direction opposite the structure 78. The amount of pressure necessary to move the pin 70 and clamp element 74 from the second position to the first position should be enough to ensure that the normal pressures to which the cable clamps are subjected are not enough to force the pin 70 and clamp element 74 to disengage from the structure 78, but not so much that a tool is needed to move the pin 70 and cable element 74 to the first position. Once the pin 70 and clamp element 74 are in the first position, the arms 92 are no longer expanded and the arms 92 may be moved out of the hole 76 and the cable clamp is disengaged from the structure 78. The process of easily moving the pin and cable element from the second position to the first position may be referred to as the quick release functionality of the cable clamp of the present invention.

Because installation of the cable clamps only requires holes in the structure, the structural designers may determine how many holes, support posts, and cables the structure may carry before the structural integrity is compromised. As such, holes may be pre-drilled in structures in areas where cables are most likely to run and the installers may easily move the cable clamps to other holes or add cable clamps, if necessary. This is a significant improvement over the conventional clamps that required compound and steel inserts in the structure, which increased the weight of the structure, and, as such, the structure would have to be redesigned and fabricated in order to move the clamps or add clamps. The simple movement and installation process for the cable clamps of the present invention is also much less time-consuming, less labor intensive and less expensive than the conventional installation and movement process that required compound, steel inserts, and possibly a new structure to move or add conventional cable clamps.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for attaching a cable to a structure, comprising:
an elongated rod having a varying cross-section in a longitudinal direction;
first and second elongate sleeves, each having an expandable engagement member, mounted on said elongated rod in a first position to facilitate insertion of said expandable engagement member of said first sleeve in a hole defined by the structure and said expandable engagement member of said second sleeve in said first sleeve, said first and second sleeves capable of being axially translated along said elongated rod to a second position to facilitate a positive engagement of said expandable engagement member of said first sleeve within the hole wherein the elongated rod causes radial expansion of said expandable engagement member of said second sleeve within said first sleeve to facilitate a positive engagement of the expanded engagement member of the second sleeve with said first sleeve; and
at least one attachment element carried by at least one of said first and second sleeves, wherein said attachment element is adapted to be attached to the cable.

2. The apparatus of claim 1, wherein said elongated rod comprises:
a first portion of a first cross-sectional shape; and
a second portion of a second cross-sectional shape larger than the first cross-sectional shape and disposed proximate to and displaced in the longitudinal direction from said first portion.

3. The apparatus of claim 2, wherein said first portion is a first cylindrical portion and said second portion is a second cylindrical portion.

4. An apparatus of claim 2 wherein said elongated rod comprises a plurality of pairs of first and second portions.

5. The apparatus of claim 4, wherein said elongated rod further comprises a circumferential groove between the pairs of first and second portions.

6. The apparatus of claim 4, further comprising a plurality of said elongate sleeves mounted on said elongated rod, each sleeve associated with a respective pair of first and second portions such that said sleeve loosely surrounds the first portion and the second portion while in the first position and engages the second portion while in the second position, thereby radially expanding said sleeve.

7. The apparatus of claim 1, wherein each expandable engagement member is capable of radially expanding as said sleeve is moved from the first position to the second position; and wherein at least one of said first and second elongate sleeves further comprises:
an annular member connected to said expandable engagement member for carrying said attachment element.

8. The apparatus of claim 1, further comprising at least one tie member capable of attaching the cable to said attachment element.

9. An apparatus for attaching cables to a structure, comprising:
   an elongated rod having a lengthwise cross-section of varying shape;
   first and second elongate sleeves mounted on said elongated rod in a first position and capable of being axially translated along said elongated rod to a second position, said first sleeve comprising an expandable engagement member configured to expandedly engage within a hole defined by the structure in the second position and said second sleeve comprising an expandable engagement member configured to configured to radially expand within said first sleeve in the second position to facilitate a positive engagement of the expandable engagement member of said second sleeve with said first sleeve; and
   a tie member capable of attaching the cable to at least one of said first and second sleeves.

10. The apparatus of claim 9, wherein said elongated rod comprises:
    a first portion of a first cross-sectional shape; and
    a second portion of a second cross-sectional shape larger than the first cross-sectional shape and disposed proximate to and displaced in the longitudinal direction from said first portion.

11. The apparatus of claim 10, wherein said first portion is a first cylindrical portion and said second portion is a second cylindrical portion.

12. The apparatus of claim 10, wherein said elongated rod comprises a plurality of pairs of first and second portions.

13. The apparatus of claim 12, wherein said elongated rod further comprises a circumferential groove between the pairs of first and second portions.

14. The apparatus of claim 12, wherein each sleeve is associated with a respective pair of first and second portions such that said sleeve loosely surrounds the first portion and second portion while in the first position and engages the second portion while in the second position, thereby radially expanding said sleeve.

15. The apparatus of claim 9, wherein at least one of said first and second elongate sleeves comprises:
    an annular member connected to said expandable engagement member for carrying said tie member.

16. A method for attaching a cable to a structure, comprising:
    providing an elongated rod having a varying cross-section in a longitudinal direction and first and second elongate sleeves capable of being axially translated along the elongated rod, the first sleeve having an expandable engagement member;
    inserting said expandable engagement member of the first sleeve into a hole defined by the structure;
    translating the first and second sleeves axially along the elongated rod to facilitate positive engagement of the expandable engagement member of the first sleeve within the hole wherein the elongated rod causes radial expansion of an expandable engagement member of the second sleeve within the first sleeve to facilitate a positive engagement of the second sleeve with the first sleeve; and
    attaching at least one cable to at least one of the first and second sleeves.

17. The method of claim 16, further comprising mounting the first and second sleeves upon the elongated rod in a first position prior to inserting said expandable engagement member of the first sleeve into the hole defined by the structure.

18. The method of claim 16, wherein translating the first and second sleeves axially along the elongated rod comprises expanding said expandable engagement member of the first sleeve within the hole.

19. The method of claim 16, wherein attaching at least one cable to at least one of the first and second sleeves comprises encircling at least one cable and an attachment element carried by the sleeve with a tie member.

* * * * *